United States Patent
Johnston

(10) Patent No.: US 9,264,339 B2
(45) Date of Patent: *Feb. 16, 2016

(54) HOSTED NETWORK MANAGEMENT

(71) Applicant: Amazon Technologies, Inc., Reno, NV (US)

(72) Inventor: Simon K. Johnston, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,411

(22) Filed: Sep. 12, 2014

(65) Prior Publication Data

US 2015/0067159 A1 Mar. 5, 2015

Related U.S. Application Data

(63) Continuation of application No. 13/231,120, filed on Sep. 13, 2011, now Pat. No. 8,838,764.

(51) Int. Cl.
*G06F 15/16* (2006.01)
*H04L 12/26* (2006.01)
*H04L 12/24* (2006.01)
*G06F 9/455* (2006.01)

(52) U.S. Cl.
CPC ............ *H04L 43/12* (2013.01); *H04L 41/0866* (2013.01); *G06F 2009/45595* (2013.01)

(58) Field of Classification Search
CPC ......... H04L 45/22; H04L 41/12; H04L 12/66; H04L 67/1072; H04L 41/0803; H04L 41/0866; H04L 43/12; F24F 2011/0067; G06F 17/30598; G06F 2009/45595; G05B 2219/31198
See application file for complete search history.

(56) References Cited

U.S. PATENT DOCUMENTS

| | | | |
|---|---|---|---|
| 5,768,552 A * | 6/1998 | Jacoby | G06T 11/206 345/418 |
| 5,920,542 A * | 7/1999 | Henderson | 370/217 |
| 6,766,368 B1 | 7/2004 | Jakobson et al. | |
| 6,941,557 B1 | 9/2005 | Jakobson et al. | |
| 7,113,990 B2 * | 9/2006 | Scifres et al. | 709/224 |
| 7,284,048 B2 | 10/2007 | Jakobson et al. | |
| 7,305,464 B2 * | 12/2007 | Phillipi et al. | 709/223 |
| 7,412,514 B2 * | 8/2008 | Shuster | 709/226 |
| 7,533,141 B2 | 5/2009 | Nadgir et al. | |
| 7,720,009 B2 * | 5/2010 | Mellachervu | H04L 12/4641 370/255 |
| 7,756,928 B1 | 7/2010 | Meenan et al. | |
| 7,930,214 B2 | 4/2011 | Knauerhase et al. | |
| 7,979,368 B2 | 7/2011 | Kapoor et al. | |
| 8,041,799 B1 | 10/2011 | Usery et al. | |
| 8,125,927 B2 * | 2/2012 | Nandy | H04L 45/02 370/254 |
| 8,131,870 B1 | 3/2012 | Moon | |

(Continued)

*Primary Examiner* — Sargon Nano
(74) *Attorney, Agent, or Firm* — Knobbe, Martens, Olson & Bear, LLP

(57) ABSTRACT

Systems and methods are disclosed that facilitate the evaluation of hosted computing devices in accordance with target patterns. A set of target patterns can be developed for elements common to a plurality of hosted computing networks. The set of target patterns can be defined utilizing a detailed pattern language to describe elements of a hosted computing device network and relationships between the elements. Thereafter, a hosted computing device network management component can utilize the set of target patterns to verify and validate a deployed hosted computing network or to process purposed modifications/configurations to a deployed hosted computing network.

20 Claims, 6 Drawing Sheets

(56) References Cited

U.S. PATENT DOCUMENTS

| | | |
|---|---|---|
| 8,239,479 B2 | 8/2012 | Sagar et al. |
| 8,302,093 B2 | 10/2012 | Berg et al. |
| 8,352,632 B2 | 1/2013 | Voigt et al. |
| 8,363,543 B2 * | 1/2013 | George et al. ................. 370/225 |
| 8,417,658 B2 * | 4/2013 | Arnold ..................... G06N 5/02 |
| | | 701/100 |
| 8,453,075 B2 * | 5/2013 | Guo .......................... G03F 1/70 |
| | | 716/119 |
| 8,543,573 B2 | 9/2013 | MacPherson |
| 8,543,681 B2 * | 9/2013 | Bearden ............. H04L 12/2697 |
| | | 709/218 |
| 8,565,108 B1 * | 10/2013 | Marshall ................ G06F 21/60 |
| | | 370/252 |
| 8,626,921 B2 | 1/2014 | Chekhanovskiy et al. |
| 8,780,758 B2 * | 7/2014 | Bukofser et al. ............. 370/254 |
| 8,838,764 B1 | 9/2014 | Johnston |
| 8,984,503 B2 * | 3/2015 | Poddar .............. G06F 17/30247 |
| | | 717/173 |
| 2003/0028624 A1 * | 2/2003 | Hasan et al. .................. 709/220 |
| 2003/0074440 A1 | 4/2003 | Grabarnik et al. |
| 2003/0135609 A1 * | 7/2003 | Carlson ................. G06F 9/5011 |
| | | 709/224 |
| 2004/0103183 A1 | 5/2004 | Ku |
| 2004/0168138 A1 * | 8/2004 | Neal ................... G06F 17/5081 |
| | | 716/112 |
| 2005/0135330 A1 * | 6/2005 | Smith et al. .................... 370/351 |
| 2005/0276229 A1 | 12/2005 | Torabi |
| 2006/0085543 A1 | 4/2006 | Hrastar et al. |
| 2007/0280241 A1 * | 12/2007 | Verma ........................... 370/392 |
| 2008/0225716 A1 * | 9/2008 | Lange ........................... 370/232 |
| 2009/0171705 A1 * | 7/2009 | Bobak et al. ..................... 705/7 |
| 2010/0042989 A1 * | 2/2010 | Anand et al. .................. 717/176 |
| 2010/0094981 A1 | 4/2010 | Cordray et al. |
| 2011/0238855 A1 | 9/2011 | Korsunsky et al. |
| 2011/0277026 A1 | 11/2011 | Agarwal et al. |

* cited by examiner

HOSTED NETWORK MANAGEMENT

RELATED APPLICATIONS

Incorporation by Reference to Any Priority Applications

Any and all applications for which a foreign or domestic priority claim is identified in the Application Data Sheet as filed with the present application are incorporated by reference under 37 CFR 1.57 and made a part of this specification.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, a virtual machine instance may be associated with different combinations of operating systems or operating system configurations, virtualized hardware resources, and software applications or software application configurations to enable the virtual machine instance to provide different desired functionalities, or to provide similar functionalities more efficiently. For example, a data center may offer customers virtual machine instance types corresponding to database servers, web servers, networking devices, and the like. In more complex embodiments, data centers can further offer hosted virtual machine or hosted computing device networks including a number of interconnected computing devices (including physical computing devices or virtual machine instances).

In order to assist customer with the design and deployment of hosted networks, data centers can provide modeling tools that can describe aspects of a hosted network in accordance with the data center's best practices. For example, a customer may be presented with a graphical interface that allows the selection of various computing device components to be included in a hosted network and suggests appropriate configurations or interconnections for the selected computing device components. However, such design tools do not provide guidance in terms of modifications to a hosted network. Accordingly, performance of a hosted network may erode over time.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of hosted computing networks. Specifically, systems and methods are disclosed that facilitate the evaluation of hosted computing devices in accordance with target patterns. Illustratively, a set of target patterns can be developed for elements common to a plurality of hosted computing networks. The set of target patterns can be defined utilizing a detailed pattern language to describe elements of a hosted computing device network and relationships between the elements. Thereafter, a hosted computing device network management component can utilize the set of target patterns to verify and validate a deployed hosted computing network or to process purposed modifications/configurations to a deployed hosted computing network.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to virtual machine instances running applications, one or more aspects of the present disclosure can be applied with physical computing devices or combinations of physical computing devices and virtual machine instances.

Figure 1:
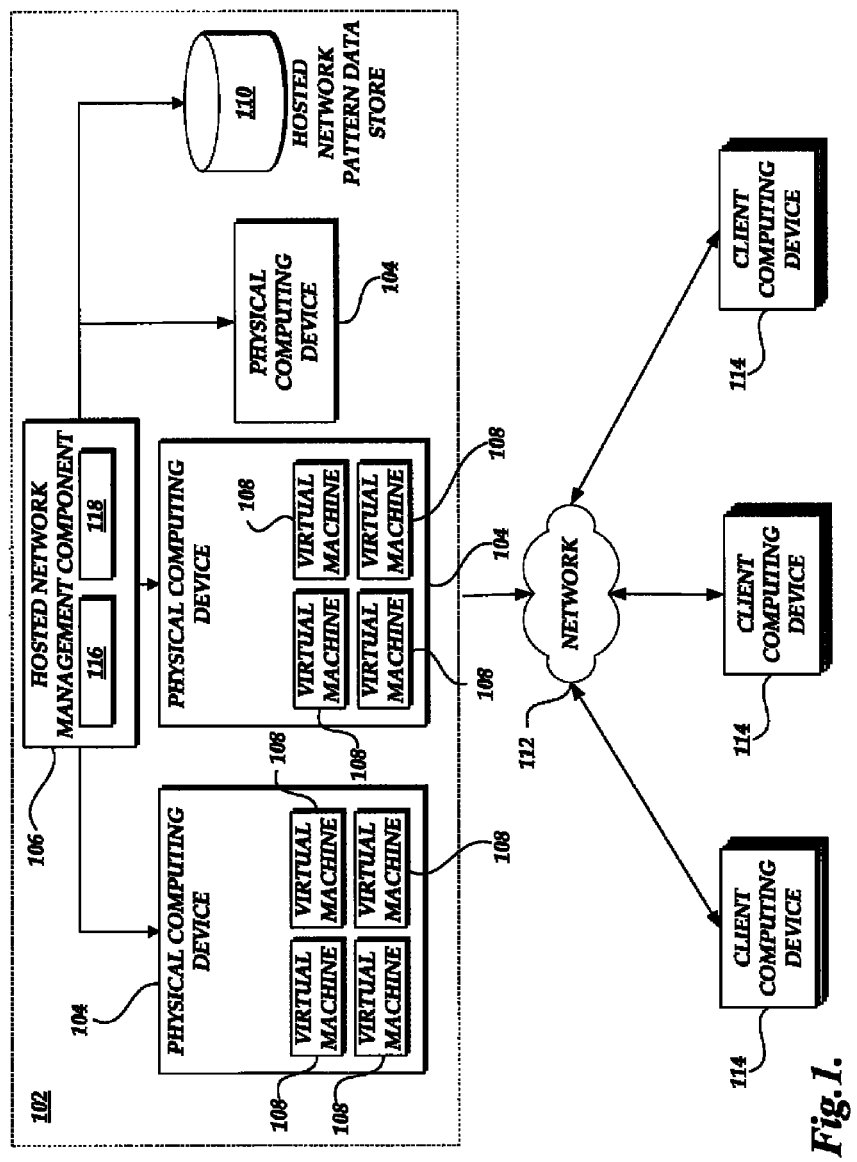
FIG. 1 is a block diagram depicting an illustrative environment for managing host computing devices including a number of host computing devices and control components.

FIG. 1 is a block diagram illustrating an embodiment of a virtual network environment 100. The virtual network environment 100 includes a virtual network 102 that includes multiple physical computing devices 104. Illustratively, one or more physical computing devices 104 are capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions. Additionally, the virtual network 102 can include one or more physical computing devices 104 that do not host virtual machine instances. In such embodiments, a hosted computing network may include combinations of physical computing devices hosting virtual machines instances and physical computing devices.

The virtual network 102 also includes hosted network management component 106 for evaluating hosted computing networks in accordance with a set of patterns. As will be explained in greater detail below with regard to FIGS. 2A and 2B, the hosted network management component 106 can match components in a deployed hosted computing network to one or more patterns and evaluate detailed pattern language to validate the deployed hosted computing network. Additionally, the hosted network management component 106 can utilize the patterns to evaluation requested modifications or configurations to a deployed host computing network. Illustratively, the hosted network management component 106 can include various components for implementing the various functions associated with the hosted network management component. In one embodiment, the hosted network management component 106 can include an interface component 116, which can generate various graphical user interfaces accessed by client computing devices and processing inputs received by way of the graphical user interfaces. An illustrative user interface will be described with the regard to FIG. 4. Additionally, the interface component 116 can also obtain and process hosted network validation requested submitted in accordance with an API. In another embodiment, the hosted network management component 106 can also include a hosted network topology component 118 for obtaining information associated with the topology and configuration of hosted networks. One skilled in the relevant art will appreciate, however, that the hosted network management component 106 can include additional or alternative components and that the functionality associated with the hosted network management component 106 can be implemented by such additional or alternative components.

It should be appreciated that, although the hosted network management component 106 is depicted for the purpose of example as a single, standalone logical component in illustrative FIG. 1, the routines and steps performed by the hosted network management component 106 may be distributed among any number of components and executed in hardware or software. Additionally, although hosted network management component 106 is illustrated as logically associated within the virtual network 102, the hosted network management component 106 may be implemented in a separate networked environment, in conjunction with client computing devices 114, or otherwise integrated into other components/systems of the virtual network 102.

With continued reference to FIG. 1, the virtual network 102 can further include a hosted network pattern data store 110 for maintaining, at least in part, pattern information utilized by the hosted network management component 106. The hosted network pattern data store 110 may correspond to network attached storage (NAS), database servers, local storage, or other storage configurations which may be implemented in a centralized or distributed manner.

Connected to the virtual network 102 via a network 112 are multiple client computing devices 114. The network 112 may be, for instance, a wide area network (WAN), a local area network (LAN), or a global communications network. In some instances, the client computing devices 114 may interact with the virtual network 102 to request the resource optimizations for virtual machine instance types based on a definition of one or more applications associated with the virtual machine instance type.

Figure 2A:
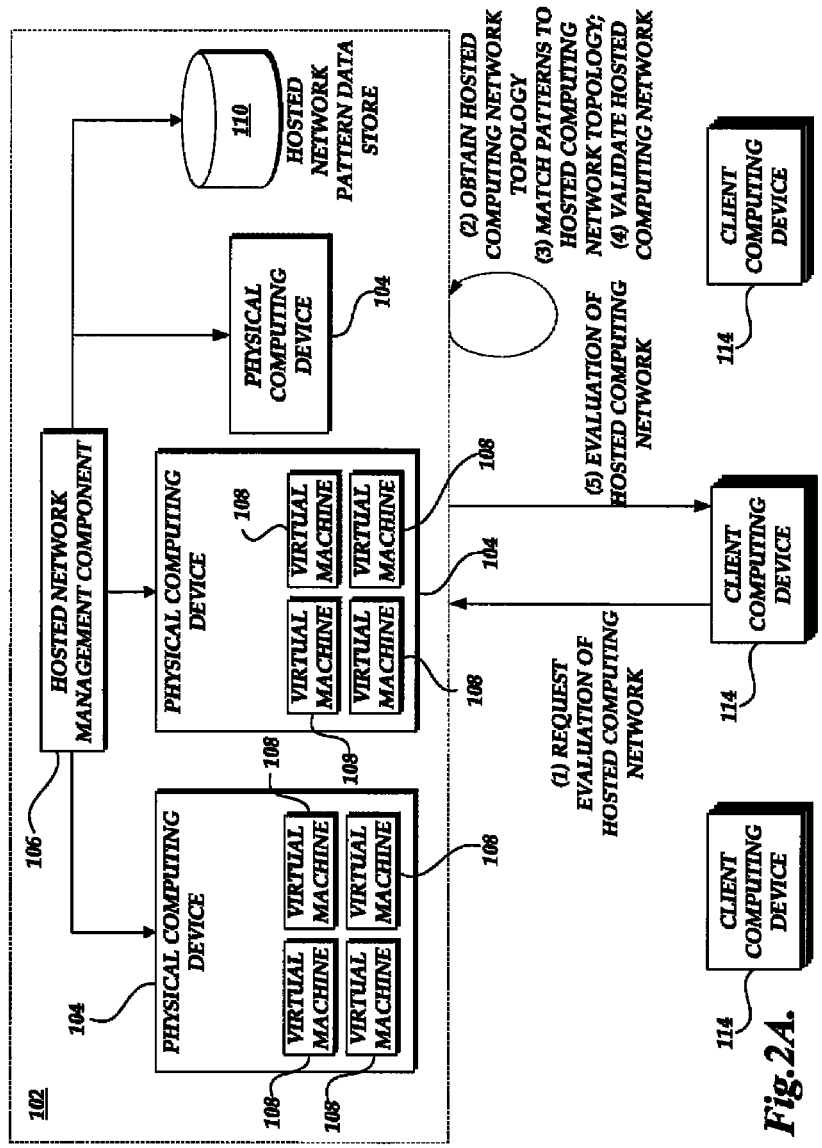
FIGS. 2A and 2B are block diagrams of the host computing device environment of FIG. 1 illustrating the processing of initiating the evaluation of a hosted computing network.
Figure 2B:
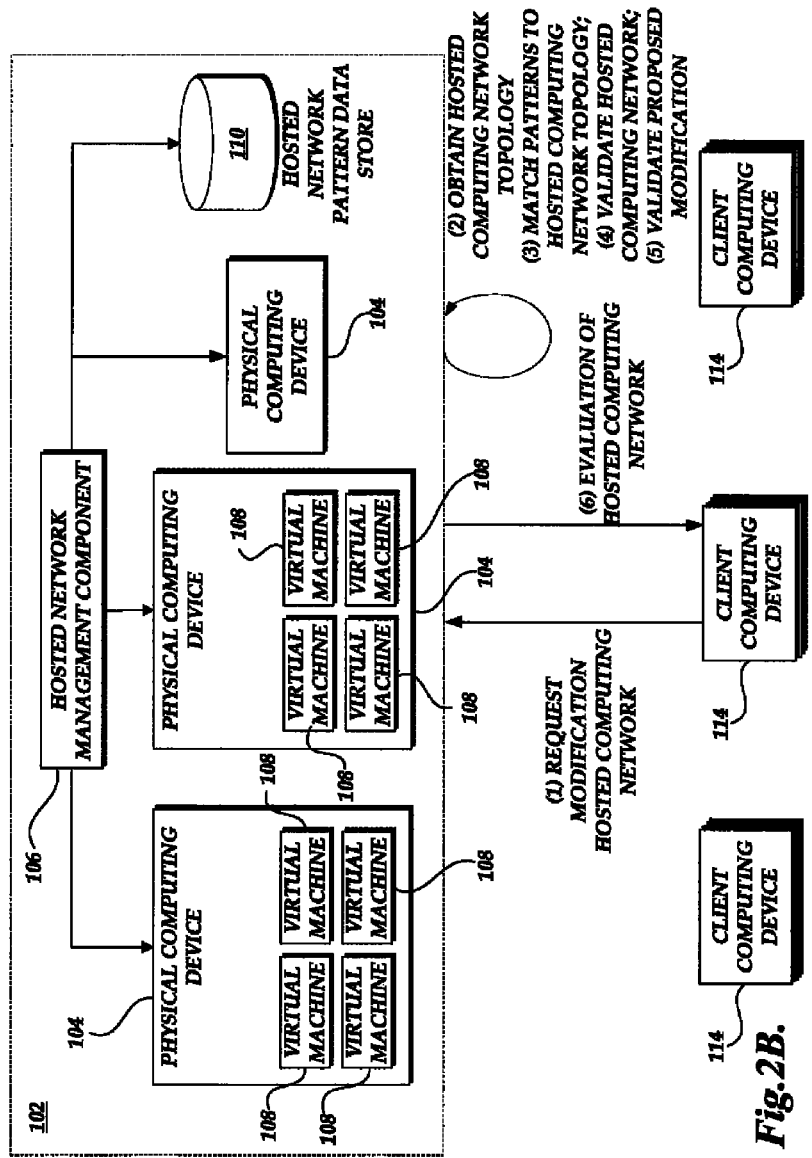

FIGS. 2A and 2B are block diagrams of the networked computing environment of FIG. 1 illustrating the processing of requests for evaluation of a hosted computing network 106. Illustratively, the evaluation of a hosted computing network provided within the virtual network 102 may be based on an initiation of a request (either direct or indirect) by a client computing device 114. Additionally, the evaluation of a hosted computing network provided with the virtual network 102 may be based on actions or events associated with the hosted computing network, such as a modification to the hosted computing network (e.g., addition of a component or altering of a configuration).

With reference to FIG. 2A, a client computing device 114 requests evaluation of a hosted computing network or validation of a hosted computing network (1). In one embodiment, the request to evaluate hosted computing network can correspond to the transmission of a request by a client computing device 114 to the hosted network management component 106 via an application protocol interface (API). Illustratively, the API can include the identification of the hosted computing network that is to be validated. In this embodiment, the request to evaluate the hosted computing network may be part of a certification or qualification process, such as a requirement of a service provider or client.

In another embodiment, the request to evaluate a hosted computing network can correspond to the transmission of a request by a client computing device 114 to the hosted computing network. The request can also be transmitted in accordance with an API. In this embodiment, the hosted network management component 106, or other component of the virtual network 102, may make the processing of the request dependent on the evaluation of the hosted computing network.

Upon receipt of the request (either directly or inferred), the hosted network management component 106 identifies the hosted computing device network and the topology associated with the hosted computing network (2). Illustratively, the hosted network management component 106 can recall topology information maintained by the virtual network 102. Additionally, the hosted network management component 106 can obtain the topology information from one or more physical computing devices 104 that are associated with the hosted computing network, such as via polling through the hosted network topology component 118. In other embodiments, the hosted network management component 106 can utilize configuration information provided by the client computing devices 114 that provide the hosted network topology information. For example, a system administrator can select a subset of a configured network to be validated.

Based on the topology of the hosted computing network, the hosted network management component 106 then attempts to match a set of patterns to the hosted computing network (3). Illustratively, patterns can be defined in terms of a pattern definition language that can specify components of a hosted computing network and the interaction between specified components of a hosted computing network. For example, a pattern may identify database servers as a component and specify that within a hosted computing network, database servers should be associated with at least three geographic zones (e.g., data centers). Accordingly, pattern matching can relate to the attempted identification of the components of the hosted computing network and various attributes or relationships for the identified components. In some embodiments, the hosted network management component 106 can identify a perfect match for a hosted computing network. In other embodiments, the hosted network management component 106 can identify one or more partial matches for a hosted computing network.

If the hosted network management component 106 can find matches or partial matches, the hosted network management component 106 can validate the deployed hosted computing network (4). In one embodiment, the hosted network management component 106 can attempt to process all of the identified set of patterns identified as matching or partially matching the subset of the network topology. Additionally, in another embodiment, the hosted network management component 106 can process multiple patterns simultaneously, especially in embodiments in which the processing of a particular pattern may be process intensive task. Thereafter, the hosted network management component 106 can transmit a notification to the requesting client computing device 114 indicative of the result of the validation request (5).

With reference now to FIG. 2B, in an alternative embodiment, the client computing device 114 can initiate the validation of a hosted computing network based on a request to modify, add or delete one or more components of the deployed hosted computing network (1). For example, a client computing device 114 can transmit a request to remove a virtual machine instance of a database server. In another example, a client computing device 114 can request instantiation of a virtual machine instance 108 with a specific software configuration. Upon receipt of the request (either directly or inferred), the hosted network management component 106 identifies the hosted computing device network and the topology associated with the hosted computing network (2). Illustratively, the hosted network management component 106 can recall topology information maintained by the virtual network 102. Additionally, the hosted network management component 106 can obtain topology information from one or more physical computing devices 104 that are associated with the hosted computing network, such as via polling through the hosted network topology component 118. In other embodiments, the hosted network management component 106 can utilize configuration information provided by the client computing devices 114 that provide the hosted network topology information. For example, the interface component 116 can obtain a specification of components or types of components to be validated via an API.

Based on the topology of the hosted computing network, the hosted network management component 106 then attempts to match a set of patterns to the hosted computing network (3). Illustratively, patterns can be defined in terms of a pattern definition language that can specify components of a hosted computing network and the interaction between specified components of a hosted computing network. For example, a pattern may identify database servers as a component and specify that within a hosted computing network, database servers should be associated with at least three geographic zones (e.g., data centers). Accordingly, pattern matching can relate to the attempted identification of the components of the hosted computing network and various attributes or relationships for the identified components. In some embodiments, the hosted network management component 106 can identify a perfect match for a hosted computing network. In other embodiments, the hosted network management component 106 can identify one or more partial matches for a hosted computing network.

If the hosted network management component 106 can find matches or partial matches, the hosted network management component 106 can validate the deployed hosted computing network (4). Additionally, the hosted network management component 106 can validate the proposed modification to the deployed hosted computing network (5). Thereafter, the hosted network management component 106 can transmit a notification to the requesting client computing device 114 indicative of the result of the validation request (6). For example, the notification can correspond to a confirmation that the requested modification has been approved.

Figure 3A:
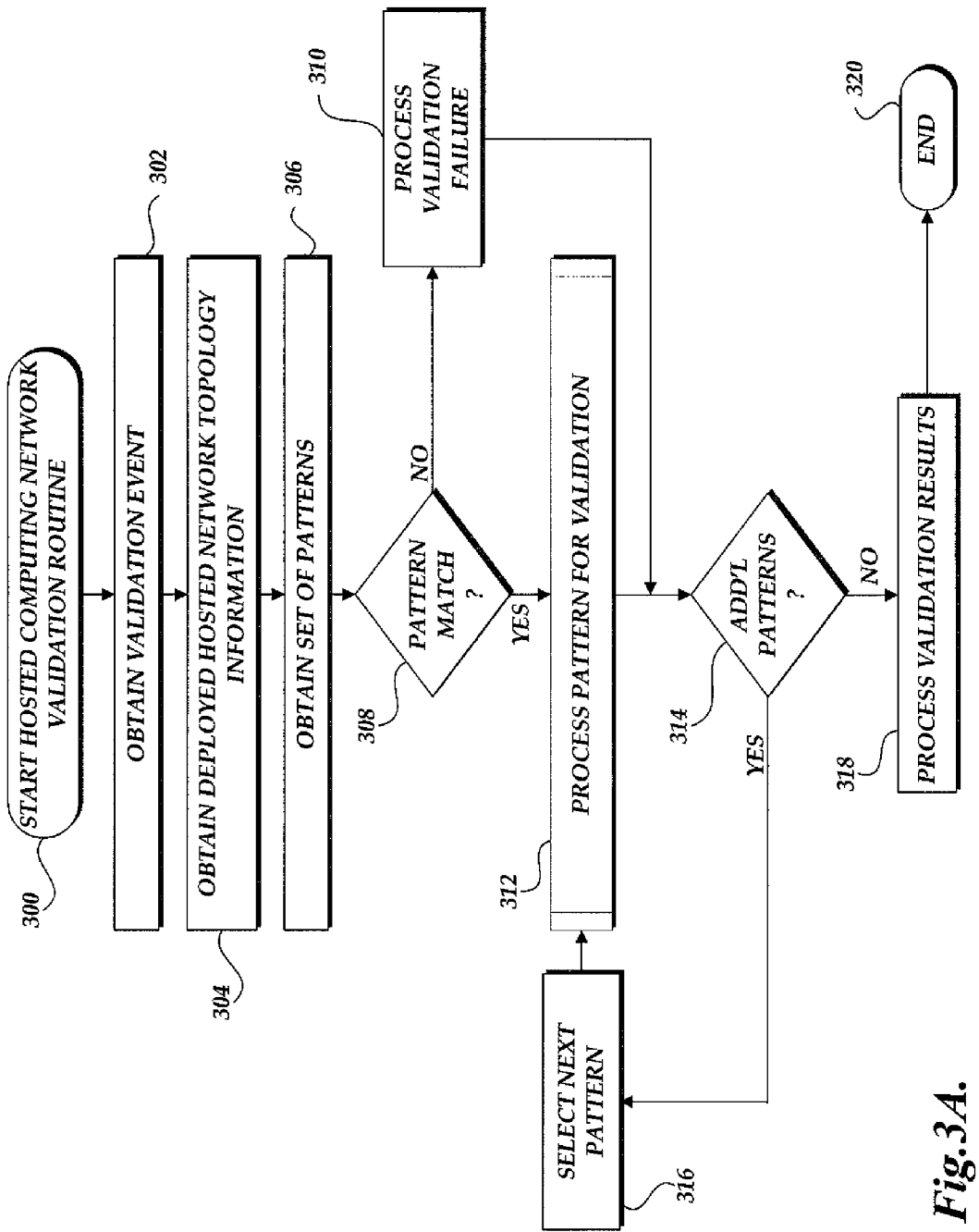
FIG. 3A is a flow diagram illustrative of a hosted computing device validation routine implemented by a hosted network management component.

Turning now to FIG. 3A, a routine 300 implemented by the hosted network management component 106 for conducting an evaluation of a hosted computing network instance will be described. Although routine 300 will be described with regard to implementation by the hosted network management component 106, one skilled in the relevant art will appreciate that alternative components may implement routine 300 or that one or more of the blocks may be implemented by a different component or in distributed manner.

At block 302, the hosted network management component 106 obtains a validation event. In one embodiment, the validation event can correspond to request submitted via an API. Illustratively, the API can include the identification of the hosted computing network or one or more components of the hosted computing network. As previously described, the request can correspond to a request for the evaluation of the hosted computing network. Alternatively, the request can correspond to a request to utilize the hosted computing network, which is then interpreted as also including a request to evaluate the hosted computing network. Still further, the request can include the specification (or interpretation) of the request to validate a portion of the hosted network. For example, the request can identify specific components or types of components associated with the hosted computing network. In another example, the request can identify portions of the hosted computing network to validate.

At block 304, the hosted network management component 106 obtains topology information for the identified hosted computing network. Illustratively, the topology information identifies the components of the hosted computing network, configurations for the components of the hosted computing network and relationships between the components of the hosted computing network. As previously describe, the hosted network management component 106 can interface with the components of the hosted network to obtain the topology information or request topology information from a management component associated with the hosted computing network. Still further, the hosted network management component 106 can also obtain topology information as part of the request process, which can be independently validated.

At block 306, the hosted network management component 106 obtains the set of patterns that will be utilized to match one or more components of the identified hosted computing network. As previously described, patterns can be defined in terms of a pattern definition language that can specify components of a hosted computing network and the interaction between specified components of a hosted computing network. For example, a pattern may identify load balancing devices as a component and specify that within a hosted computing network, the load balancing devices should be associated with specific software application configurations.

At decision block 308, the hosted network management component 106 attempts to pattern match the set of patterns to the topology information. Illustratively, pattern matching can relate to the attempted identification of the components of the hosted computing network and various attributes or relationships for the identified components. In some embodiments, the hosted network management component 106 can identify a perfect match for a hosted computing network. In other embodiments, the hosted network management component 106 can identify one or more partial matches for a hosted computing network. If the hosted network management component 106 cannot pattern match, the routine 300 proceeds to block 310 where the hosted network management component 106 processes a validation failure. In one embodiment, the hosted network management component 106 can transmit a notification indicative of the failure to identify any patterns that can used to validate the deployed hosted computing network. The notification can specify information or criteria utilized to make the pattern matching, which can be adjusted or modified. The routine 300 proceeds to decision block 314, which will be described below.

With reference again to decision block 308, if the hosted network management component 106 can match a single pattern or set of patterns, at block 312, the hosted network management component 106 processes the pattern for validation. An illustrative subroutine 350 (FIG. 3B) for processing patterns for validation will be described below. At decision block 314, the hosted network management component 106 determines whether there are additional patterns that have been identified to process. In an illustrative embodiment, the hosted network management component 106 may not be able to identify a single pattern that matches deployed hosted computing network. Accordingly, the hosted network management component 106 can utilize a number of partially matching patterns. Illustratively, the hosted network management component 106 does not need to wait for the completion of a pattern validation before beginning the validation of other identified patterns. Accordingly, if additional patterns are identified at decision block 314, the hosted network management component 106 selects a next pattern at block 316 and routine 300 returns to block 312 for processing the additional pattern.

Returning to decision block 314, if no additional patterns exist, at block 318, the hosted network management component 106 processes the validation results of one or more pattern matching attempts. In one embodiment, the hosted network management component 106 can transmit a notification indicative of the success or failure to validate the deployed hosted computing network. In another embodiment, the hosted network management component 106 can identify the components of the hosted computing network that were the cause of the pattern matching failures and any partial matches. In a further embodiment, the notification indicative of a success can corresponds to the acceptance of the request to modify the hosted computing network. The routine 300 then terminates at block 320.

Figure 3B:
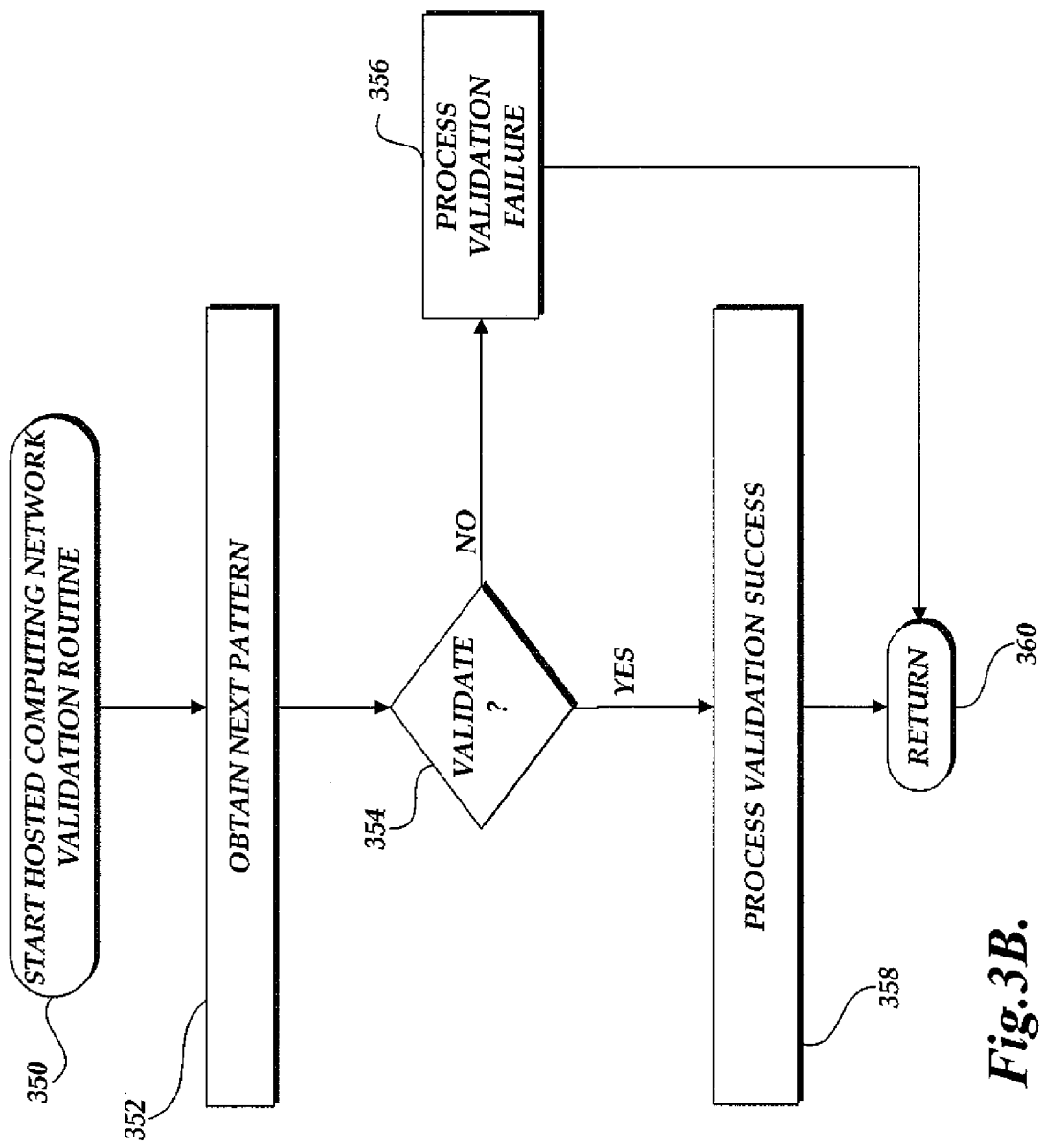
FIG. 3B is a flow diagram illustrative of a process pattern validation subroutine implemented by a hosted network management component.

Turning now to FIG. 3B, a subroutine 350 implemented by the hosted network management component 106 for processing a matching (or partially matching) pattern will be described. Illustratively, subroutine 350 can be implemented as part of the execution of block 312 (FIG. 3A). Although subroutine 350 will be described with regard to implementation by the hosted network management component 106, one skilled in the relevant art will appreciate that alternative components may implement subroutine 350 or that one or more of the blocks may be implemented by a different component or in distributed manner.

At block 352, the hosted network management component 106 obtains the next pattern to be validated. At decision block 354, the hosted network management component 106 determines whether the matched pattern can be validated based on the configurations and relationships of the components. For example, in patterns defining specific configurations or attributes for an identified component, the hosted network management component 106 can determine whether identified components in the deployed hosted computing network satisfy the configurations or attributes. Still further, the configurations or attributes can be defined in terms of ranges or thresholds. In another example, in patterns defining specific relationships between components, the hosted network management component 106 can determine whether the deployed hosted computing network components are arranged in a manner that meets the defined relationships. One skilled in the relevant art will appreciate that any number of patterns or pattern types may be implemented. Additionally, in some embodiments, a specific component may be evaluated against a series of applicable patterns.

If at decision block 354, the pattern cannot be validated, at block 356, the hosted network management component 106 processes a validation failure. In one embodiment, the hosted network management component 106 can identify the components of the hosted computing network that were the cause of the pattern matching failure (e.g., the database servers that were not at the required three data centers). In a further embodiment, the notification indicative of a failure can corresponds to the rejection of the request to modify the hosted computing network. The subroutine 300 then returns at block 360.

Alternatively, at decision block 354, the hosted network management component 106 can validate the pattern, at block 358, the hosted network management component 106 processes the pattern matching validation. Illustratively, the hosted network management component 106 can identify the components that were able to satisfy the pattern matching and one or more configurations/attributes that were utilized to determine the successful validation. The subroutine 300 then returns at block 360.

Figure 4:
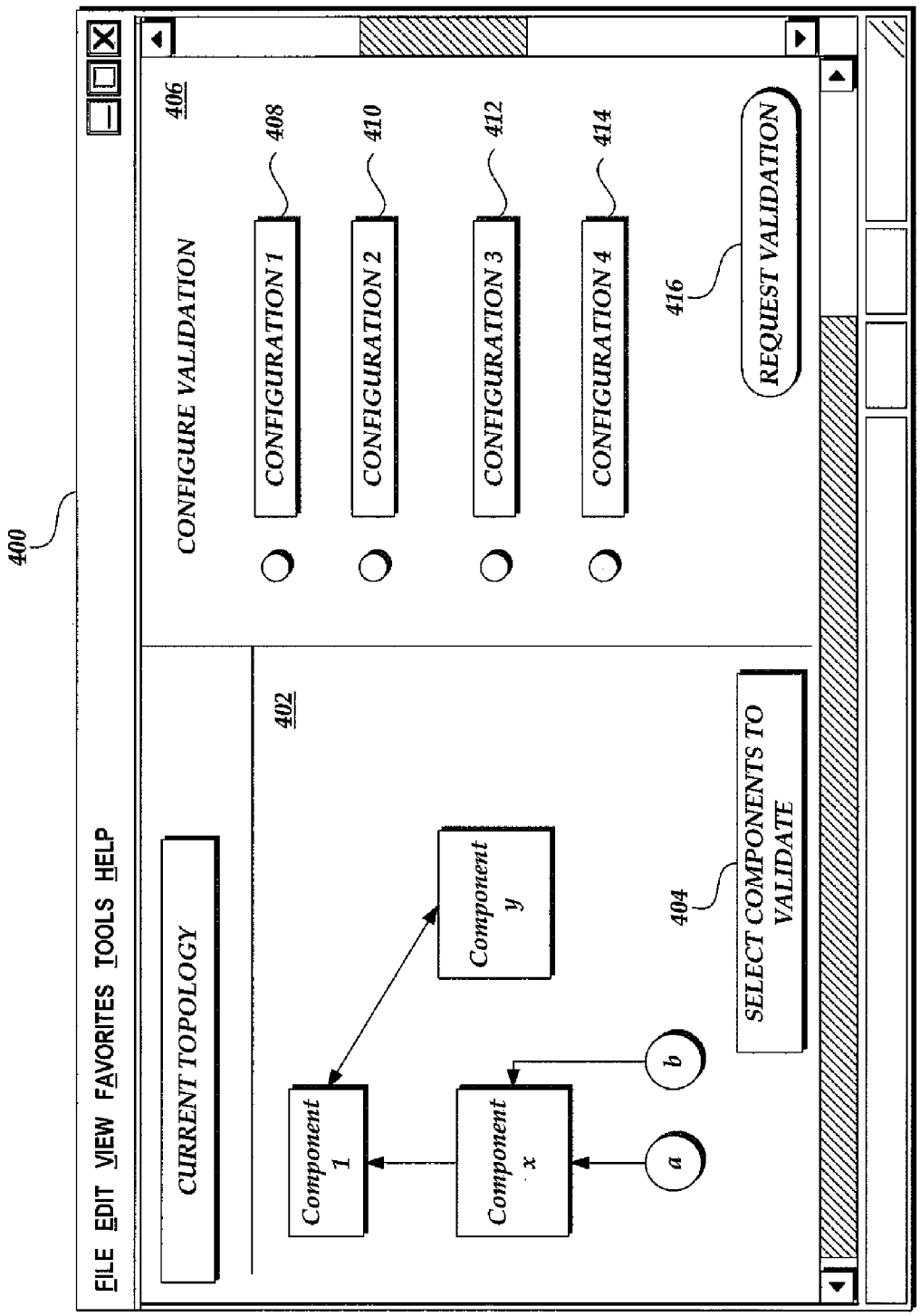
FIG. 4 is a block diagram illustrative of a screen display generated on a client computing device for initiating and configuring validation of a hosted computing network.

With reference now to FIG. 4, a block diagram illustrative of a screen display 400 generated on a client computing device for initiating and configuring validation of a deployed hosted computing network will be described. One skilled in the relevant art will appreciate, however, that the screen display 400 is utilized to illustrative various aspects that can be incorporated into a user interface, but do not necessarily need to be combined or organized in accordance with screen display 400.

In a first aspect, the screen display 400 includes a first portion 402 that allows the display of a deployed hosted computing network topology. In one embodiment, the network topology information may be provided by the hosted network management component 106 in a read only form for display. In other embodiment, the topology information may be provided by the hosted network management component 106 in a modifiable form. Accordingly, a user can modify the network topology information for implementation of "what if" scenarios or to correct errors or inaccuracies. The first portion 402 also facilitates that selection of one or more components of the deployed hosted computing network. For example, a user can select displayed components and utilize the control 404 to specify a subset of the deployed hosted computing network that will be validated.

In a second aspect, the screen display 400 can include a second portion 406 for configuration the validation of the deployed hosted computing network. As illustrated in FIG. 4, the second portion 406 can provide a user with a selection of configurations (408, 410, 412, 414) that can be utilized to assist the determination of which patterns may be utilized to validate the deployed hosted computing network, or selection portion thereof. For example, a user can select a "security" configuration that facilitates the selection of one or more patterns related to or defined in accordance with security best practices. The second portion 406 can include a control 416 for initiating the validation.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing hosted computing networks, comprising:
   generating, by an interface component, a user interface for display of network topology information associated with an existing hosted computing network, wherein the network topology information identifies relationships and attributes of components within the existing hosted computing network, wherein the user interface comprises at least one control to modify the network topology information associated with at least one component of the existing hosted computing network;
   obtaining, by a hosted network management component, a request for a proposed modification of at least a subset of the network topology information associated with the existing hosted computing network, wherein the request is based, at least in part, on input received from the at least one control;
   obtaining, by the hosted network management component, one or more patterns, wherein each of the one or more patterns defines at least one attribute or relationship associated with a component of the existing hosted computing network;
   determining, by the hosted network management component, whether the one or more patterns match the proposed modification of at least a subset of the network topology information associated with the existing hosted computing network; and
   if at least one pattern of the one or more patterns matches the requested modification of the existing hosted computing network, transmitting, by the hosted network management component, a notification that the proposed modification of at least a subset of the network topology information associated with the existing hosted computing network has been approved.

2. The method of claim 1, wherein the one or more patterns are specified in accordance with a pattern language.

3. The method of claim 1, wherein determining whether the one or more patterns match the proposed modification includes determining a partial match of the one or more patterns.

4. The method of claim 3, wherein the notification indicates the components of the proposed modification that were the cause of the partial match.

5. The method of claim 1 further comprising implementing the proposed modification to the existing hosted computing network.

6. The method of claim 1 further comprising identifying components of the proposed modification that caused a pattern matching failure if at least one pattern fails to match the requested modification of the existing hosted computing network.

7. The method of claim 1, wherein the notification includes an identification of the at least one pattern that matches the proposed modification.

8. The method of claim 1, wherein the user interface provides a graphical representation of the network topology comprising representations of components and relationships between the components for at least a portion of the existing hosted computing network.

9. The method of claim 1, wherein a user can select components and modify the configuration of the network topology.

10. The method of claim 1, wherein the user interface provides selectable network configuration options based on patterns that may be utilized to request a modification the existing hosted computing network.

11. A system for managing hosted computing networks comprising:
   a computing device, having a processor and memory, the computing device configured to execute computer-executable instructions to at least:
      obtain a request for a proposed modification of an existing hosted computing network, wherein the proposed modification modifies at least one component of the existing hosted computing network;
      obtain network topology information associated with the existing hosted computing network, wherein the network topology information identifies relationships and attributes of components within the existing hosted computing network;

obtain one or more patterns, wherein each of the one or more patterns defines at least one attribute or relationship associated with a component of the existing hosted computing network;

determine whether the one or more patterns match the proposed modification of the hosted computing network; and based, at least in part, on the determination that at least one pattern matches the proposed modification of the existing hosted computing network, transmit a notification that the proposed modification of the existing hosted computing network has been approved.

12. The system of claim 11, wherein the determination of whether the one or more patterns match includes determining a partial match of the one or more patterns.

13. The method of claim 12, wherein the notification indicates the components of the proposed modification that were the cause of the partial match.

14. The system of claim 11, wherein the computing is further configured to implement the proposed modification to the existing hosted computing network.

15. The system of claim 11, wherein the computing device is further configured to implement an interface component to generate a user interface for display of the network topology information associated with the existing hosted computing network.

16. The system of claim 11, wherein at least a portion of the network topology information is received from one or more physical computing devices associated with the hosted computing environment via polling.

17. The system of claim 11, wherein each of the at least one patterns that match the network topology information is independently evaluated.

18. A non-transitory computer-readable medium comprising computer-executable instructions that, when executed in one or more processors, configure the one or more processors to:

obtain a request for a proposed modification of an existing hosted computing network, wherein the proposed modification modifies at least one component of the existing hosted computing network;

obtain network topology information associated with the existing hosted computing network, wherein the network topology information identifies relationships and attributes of components within the existing hosted computing network;

obtain one or more patterns, wherein each of the one or more patterns defines at least one attribute or relationship associated with a component of the existing hosted computing network; and based on a determination that the one or more patterns match the proposed modification of the existing hosted computing network, transmit a notification that the proposed modification of the existing hosted computing network has been approved.

19. The computer-readable medium of claim 18, wherein the computer-executable instructions further configure the one or more processors to generate a user interface for display of the network topology information associated with the existing hosted computing network.

20. The computer-readable medium of claim 18, wherein each of the at least one patterns that match the network topology information is independently evaluated.

* * * * *